(12) United States Patent
Wang

(10) Patent No.: US 11,761,548 B2
(45) Date of Patent: Sep. 19, 2023

(54) INTEGRATED SWITCH DEVICE

(71) Applicant: TangTring Seating Technology Inc., Guangdong (CN)

(72) Inventor: Zhi-Gang Wang, Guangdong (CN)

(73) Assignee: TANGTRING SEATING TECHNOLOGY INC., Huizhou (CN)

( * ) Notice: Subject to any disclaimer, the term of this patent is extended or adjusted under 35 U.S.C. 154(b) by 72 days.

(21) Appl. No.: 17/624,005

(22) PCT Filed: Jun. 15, 2020

(86) PCT No.: PCT/CN2020/096132
§ 371 (c)(1),
(2) Date: Dec. 30, 2021

(87) PCT Pub. No.: WO2021/017666
PCT Pub. Date: Feb. 4, 2021

(65) Prior Publication Data
US 2022/0235872 A1    Jul. 28, 2022

(30) Foreign Application Priority Data

Jul. 31, 2019    (CN) .......................... 201910698009.7

(51) Int. Cl.
*F16K 11/24*    (2006.01)
*F16K 27/02*    (2006.01)
*G05D 7/06*    (2006.01)

(52) U.S. Cl.
CPC .......... *F16K 11/24* (2013.01); *F16K 27/0263* (2013.01); *G05D 7/0688* (2013.01)

(58) Field of Classification Search
CPC .... F16K 11/24; F16K 17/363; F16K 31/0682; F16K 31/10; G05D 7/0688
See application file for complete search history.

(56) References Cited

U.S. PATENT DOCUMENTS

| 5,730,359 | A | * | 3/1998 | Wurth | ................... | B05C 5/0225 |
| | | | | | | 239/66 |
| 2004/0169359 | A1 | * | 9/2004 | Isakov | .................. | B60R 21/268 |
| | | | | | | 280/736 |
| 2005/0269537 | A1 | * | 12/2005 | Kung | .................... | B60R 21/017 |
| | | | | | | 251/129.09 |

FOREIGN PATENT DOCUMENTS

| CN | 2586240 Y | 11/2003 |
| CN | 203717289 U | 7/2014 |
| CN | 206754522 U | 12/2017 |
| JP | H11253516 A | 9/1999 |

* cited by examiner

*Primary Examiner* — Reinaldo Sanchez-Medina
(74) *Attorney, Agent, or Firm* — Muncy, Geissler, Olds & Lowe, P.C.

(57) ABSTRACT

An integrated switch device includes an air valve assembly and a switch assembly. The air valve assembly comprises a flow channel base, a first air valve, and a second air valve. The flow channel base has a first air supply path and a second air supply path. The first air valve is provided on the first air supply path, and the second air valve is provided on the second air supply path. In addition, the switch assembly comprises an electrical control module controlled to output an on-off signal to an air pump, and an operation cover fitted and connected to the electrical control module.

13 Claims, 13 Drawing Sheets

INTEGRATED SWITCH DEVICE

FIELD OF THE INVENTION

The invention relates to a switch device, in particular to an integrated switch device.

BACKGROUND OF THE INVENTION

In the conventional method, in order to control gas charging or gas discharging of an object connected to a gas supply device, a gas path changeover switch is installed between the gas supply device and the object. By switching the gas path changeover switch, different gas paths are blocked or unblocked and the object receives the gas from the gas supply device or releases the gas inside the object.

Further, most of the conventional gas path changeover switch is a gas valve, such as the structure of China Patent No. 206754522U. The patent provides a gas charging and discharging valve, which comprises a valve body with an inner cavity, a clamping plate provided with the valve body, a button for connecting the valve body with the clamping plate and at least one hollow valve rod arranged in the inner cavity. The valve body is provided with a gas inlet channel communicated with the outside, a first gas exhaust channel communicated with the outside and a second gas exhaust channel communicated with the gas inlet channel or the first gas exhaust channel respectively A gas hole communicated with the hollow part of the valve rod is formed in one side of the hollow valve rod. When the button is pushed and the gas charging and discharging valve performs a seesaw movement relative to the clamping plate, the button pushes the hollow valve rod to make the gas hole be communicated with the gas inlet channel or the first gas exhaust channel, so that either the gas inlet channel or the first gas exhaust channel is communicated with the second gas exhaust channel. In other words, when the gas charging and discharging valve is connected to the gas inlet channel by a gas supply device and connected to the second gas exhaust channel by an object, the seesaw movement of the button allows the gas in the gas supply device to be inflated to the object or allows the gas in the object to be deflated to the first gas exhaust channel.

However, the gas charging and discharging valve provided the hollow valve rod that changes only a gas path of the gas charging and discharging valve, but does not simultaneously control the gas supply device. In other words, a gas supply control device must be installed beside the gas charging and discharging valve, so that when gas charging and gas discharging of the object is controlled, the gas supply device can also be controlled to output gas or not. Furthermore, installation of all the aforementioned components and the piping arrangement in a limited installation space is difficult.

SUMMARY OF THE INVENTION

The invention aims to solve problems caused by a conventional gas path changeover switch that cannot simultaneously control a gas supply system.

A secondary purpose of the invention is to solve problems caused by a complicated conventional gas path changeover switch.

In order to achieve the above purposes, the invention provides an integrated switch device, connected to a gas pump. The integrated switch device comprises a gas valve assembly and a switch assembly. The gas valve assembly comprises a channel seat, a first gas valve and a second gas valve; the channel seat comprises a gas inlet connected to the gas pump to receive gas therefrom, a first gas outlet, a second gas outlet, a first gas supply path guiding the gas to be discharged from the first gas outlet, and a second gas supply path guiding the gas to be discharged from the second gas outlet. The first gas valve is arranged on the first gas supply path and is controlled to switch between a first blocking position blocking the first gas supply path and a first releasing position conducting the first gas supply path. The second gas valve is arranged on the second gas supply path and is controlled to switch between a second blocking position blocking the second gas supply path and a second releasing position conducting the second gas supply path. The switch assembly is assembled with the gas valve assembly and comprises an electric control module electrically connected to the gas pump and controlled to output an on-off signal to the gas pump, and an operation cover assembled with the electric control module. The operation cover performs a displacement stroke relative to the electric control module and triggers the electric control module to output the on-off signal while performing the displacement stroke. The operation cover controls at least one of the first gas valve and the second gas valve while triggering the electric control module.

In one embodiment, the gas valve assembly further comprises at least one third gas valve. The operation cover controls one of the first gas valve, the second gas valve and the third gas valve while triggering the electric control module. The channel seat comprises an exhaust port and an exhaust path connecting the first gas outlet, the second gas outlet and the exhaust port. The third gas valve is arranged on the exhaust path and is controlled to switch between a third blocking position blocking the exhaust path and a third releasing position conducting the exhaust path.

In one embodiment, the gas valve assembly further comprises a housing assembled with the channel seat and provided the electric control module to arrange therein, and a plurality of valve installation parts arranged in the housing and provided for the first gas valve, the second gas valve and the third gas valve to install, respectively; and the exhaust port of the channel seat is located in the housing.

In one embodiment, the electric control module comprises a signal generator and a control part connected to the signal generator and assembled with the operation cover. The control part is arranged at the center of the operation cover to control the operation cover to perform a tilted displacement.

In one embodiment, the gas valve assembly further comprises a housing assembled with the channel seat and provided the electric control module to arrange therein, and a plurality of valve installation parts arranged in the housing and provided for the first gas valve and the second gas valve to install, respectively.

In one embodiment, the channel seat further comprises a gas receiving base and a gas guiding plate assembled with the gas receiving base. The gas receiving base is provided with a first gas vent facing the first gas valve, a second gas vent facing the second gas valve, a first channel communicating with the first gas vent and the gas inlet, a second channel communicating with the second gas vent and the gas inlet, a third gas vent communicated with the first gas outlet, a fourth gas vent communicated with the second gas outlet, a first exhaust passage communicated with the third gas vent and the exhaust port, and a second exhaust passage communicated with the fourth gas vent and the exhaust port. At least one of the gas receiving base and the gas guiding plate is provided with a third channel and a fourth channel on one side facing the other. The third channel is communicated with the first gas vent and the third gas vent, and the fourth channel is communicated with the second gas vent and the fourth gas vent. The first gas supply path is formed with the first channel and the third channel, the second has supply path is formed with the second channel and the fourth channel, and the exhaust path is formed with the first exhaust passage and the second exhaust passage.

In one embodiment, the gas valve assembly further comprises a mechanical pressure regulating assembly, and the channel seat comprises an installation opening communicated with the first channel and the second channel, and the installation opening is provided for the mechanical pressure regulating assembly to install thereon.

In one embodiment, the first gas valve comprises a first plug facing the first gas vent, a first elastic member sleeved on the first plug and abutting the first plug and the gas receiving base at two ends respectively, and a first interlocking member pushed by the operation cover to interlock the first plug to switch between the first blocking position and the first releasing position. The second gas valve comprises a second plug facing the second gas vent, a second elastic member sleeved on the second plug and abutting the second plug and the gas receiving base at both ends respectively, and a second interlocking member pushed by the operation cover to interlock the second plug to switch between the second blocking position and the second releasing position. The third gas valve comprises a third plug facing the exhaust port, a third elastic member sleeved on the third plug and abutting the third plug and the gas receiving base at both ends respectively, and a third interlocking member pushed by the operation cover to interlock the third plug to switch between the third blocking position and the third releasing position.

In one embodiment, the gas receiving base is composed of a plurality of components, and the gas receiving base comprises a plurality of unidirectional vent valves corresponding to the first gas vent and the second gas vent.

In one embodiment, the channel seat further comprises a gas receiving base and a gas guiding plate assembled with the gas receiving base. The gas receiving base is provided with a first gas vent facing the first gas valve, a second gas vent facing the second gas valve, a first channel communicated with the first gas vent and the gas inlet, a second channel communicated with the second gas vent and the gas inlet, a third gas vent communicated with the first gas outlet and a fourth gas vent communicated with the second gas outlet. At least one of the gas receiving base and the gas guiding plate is provided with a third channel and a fourth channel on one side facing the other, the third channel is communicated with the first gas vent and the third gas vent. The fourth channel is communicated with the second gas vent and the fourth gas vent The first gas supply path is formed with the first channel and the third channel, and the second gas supply path is formed with the second channel and the fourth channel.

In one embodiment, the first gas valve comprises a first plug facing the first gas vent, a first elastic member sleeved on the first plug and abutting the first plug and the gas receiving base at two ends respectively, and a first interlocking member pushed by the operation cover to interlock the first plug to switch between the first blocking position and the first releasing position; and wherein the second gas valve comprises a second plug facing the second gas vent, a second elastic member sleeved on the second plug and abutting the second plug and the gas receiving base at two ends respectively, and a second interlocking member pushed by the operation cover to interlock the second plug to switch between the second blocking position and the second releasing position.

The improvement of the invention comprises the gas valve assembly and the switch assembly implemented in an integrated structure, so that the integrated switch device not only simultaneously controls the gas paths and the work of the gas pump, but also simplifies piping arrangement between the valve assembly and the switch assembly, thereby significantly reducing required assembly space.

DETAILED DESCRIPTION OF THE PREFERRED EMBODIMENTS

Figure 1:
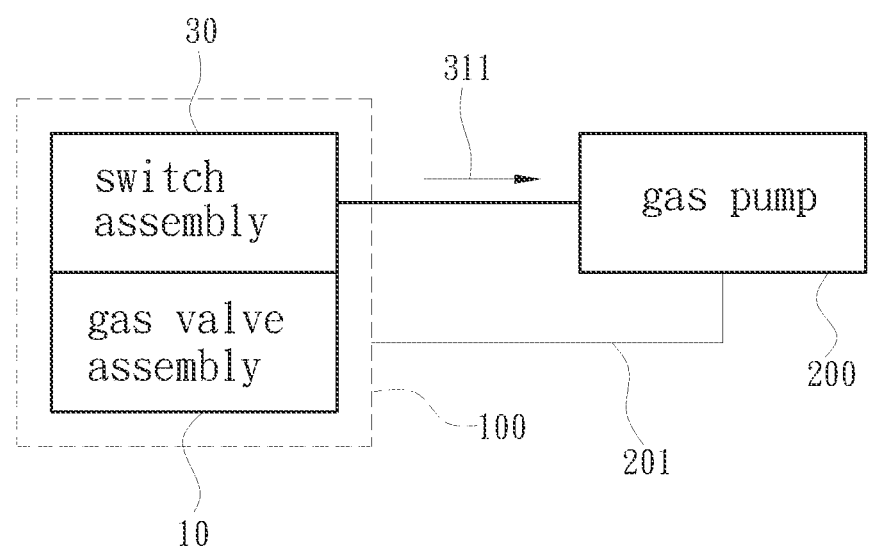
FIG. 1 is a schematic diagram of an embodiment of the invention.
Figure 2:
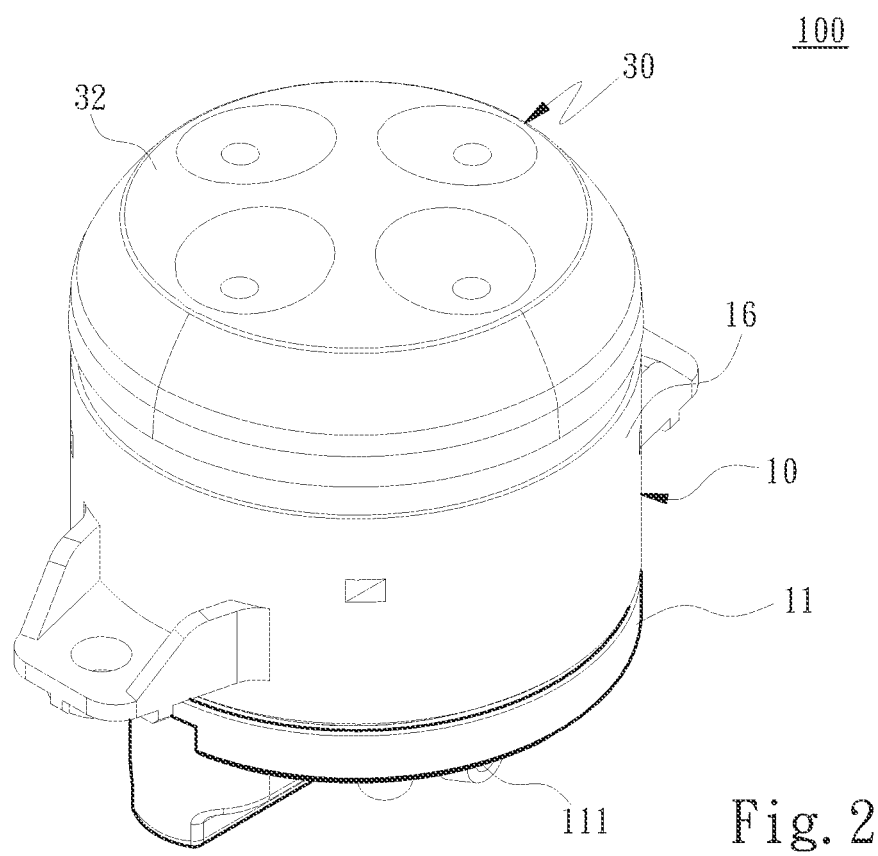
FIG. 2 is a perspective view of an embodiment of the invention.
Figure 3:
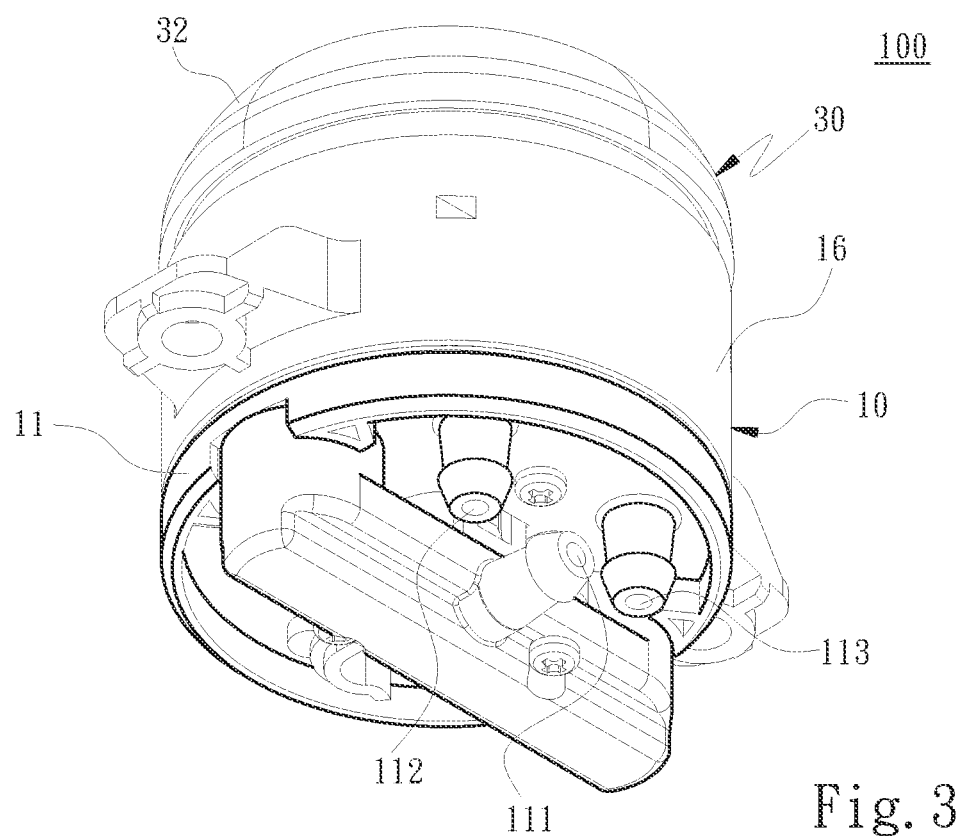
FIG. 3 is a perspective view from another angle of an embodiment of the invention.

Detailed description and technical contents of the invention are described below:

Referring to FIG. 1, FIG. 2, FIG. 3, FIG. 4, FIG. 5 and FIG. 9, the invention provides an integrated switch device 100. In one embodiment, the integrated switch device 100 is connected to a gas pump 200. The integrated switch device 100 comprises a gas valve assembly 10 and a switch assembly 30. Specifically, the gas valve assembly 10 comprises a channel seat 11, a first gas valve 14 and a second gas valve 15; the channel seat 11 comprises a gas inlet 111 connected to the gas pump 200 to receive gas 201 therefrom, a first gas outlet 112, a second gas outlet 113, a first gas supply path 114 guiding the gas 201 to be discharged from the first gas outlet 112, and a second gas supply path 115 guiding the gas 201 to be discharged from the second gas outlet 113. In addition, the first gas valve 14 is arranged on the first gas supply path 114 and is controlled to switch between a first blocking position blocking the first gas supply path 114 and a first releasing position conducting the first gas supply path 114. Further, the second gas valve 15 is arranged on the second gas supply path 115; and the second gas valve 15 is controlled to switch between a second blocking position blocking the second gas supply path 115 and a second releasing position conducting the second gas supply path 115. In FIG. 10, the second gas valve 15 is in the releasing position, while the first gas valve 14 is in the blocking position.

Moreover, the switch assembly 30 is assembled with the gas valve assembly 10. The switch assembly 30 comprises an electric control module 31 electrically connected to the gas pump 200 and an operation cover 32 assembled with the electric control module 31. Further, the operation cover 32 performs a displacement stroke A relative to the electric control module 31. When the operation cover 32 performs the displacement stroke A, the operation cover 32 controls and triggers the electric control module 31 to output an on-off signal 311 to the gas pump 200. When the electric control module 31 outputs the on-off signal 311 for starting, the gas pump 200 is started. When the electric control module 31 outputs the on-off signal 311 for stopping, the gas pump 200 is stopped. In addition, while the operation cover 32 is performing the displacement stroke A, the operation cover 32 controls at least one of the first gas valve 14 and the second gas valve 15, so that the first gas valve 14 blocks or conducts the first gas supply path 114, and the second gas valve 15 blocks or conducts the second gas supply path 115. In the invention, it is not limited to the operation cover 32 has to control the first gas valve 14 and the second gas valve 15 in a contact manner. Instead, the operation cover 32 keeps the first gas valve 14 and the second gas valve 15 respectively at the blocking position or the releasing position for a long time by the displacement stroke A. Furthermore, the displacement stroke A of the operation cover 32 is not limited to perform linear movement or tilted movement, that is, the movement of the operation cover 32 can be adjusted according to different situations.

Further, referring to FIG. 5, FIG. 8, FIG. 9 and FIG. 10, an implementation of the integrated switch device 100 is described. First, it is assumed that the operation cover 32 does not perform the displacement stroke A in an initial state, that is, the electric control module 31 does not trigger the gas pump 200, and the first gas valve 14 and the second gas valve 15 are not controlled and are respectively in the first blocking position and the second blocking position. When the operation cover 32 is displaced relative to the electric control module 31 toward the first gas valve 14, the operation cover 32 triggers the electric control module 31, so that the electric control module 31 outputs the on-off signal 311 for starting to the gas pump 200, and the gas 201 in the gas pump 200 enters the integrated switch device 100 through the gas inlet 111. In another aspect, the first gas valve 14 is controlled by the operation cover 32, so that the first gas valve 14 enters the releasing position, that is, the first gas supply path 114 is conducted, while the second gas valve 15 is still in the second blocking position because the second gas valve 15 is not in contact with the operation cover 32. Therefore, the gas 201 in the gas pump 200 will flow into the first gas supply path 114 and flow out through the first gas outlet 112. In another aspect, once the operation cover 32 is displaced toward the second gas valve 15, the operation cover 32 triggers the electric control module 31 to output the on-off signal 311 for starting to the gas pump 200. Meanwhile, the first gas valve 14 is switched from the first blocking position to the first releasing position, while the second gas valve 15 is switched from the second releasing position to the second blocking position, so that the gas 201 of the gas pump 200 will flow into the second gas supply path 115.

Therefore, according to the invention, while the operation cover 32 performs the displacement stroke A, the operation cover 32 triggers the electric control module 31 and controls at least one of the first gas valve 14 and the second gas valve 15, so that the integrated switch device 100 can synchronously control the first gas supply path 114, the second gas supply path 115 and the gas pump 200. Furthermore, the integrated switch device 100 of the invention integrates the gas valve assembly 10 and the switch assembly 30 in an integrated device, so that the piping arrangement between the gas valve assembly 10 and the switch assembly 30 is simplified, and the required assembly space can be significantly reduced.

The implementation of the invention is not limited to the specific embodiments described below. Referring to FIG. 4, FIG. 5, FIG. 6, and FIG. 7, the gas valve assembly 10 comprises a housing 16 assembled with the channel seat 11 and a plurality of valve installation parts 17 arranged in the housing 16. Furthermore, the housing 16 provided the electric control module 31 to be placed therein, so that the electric control module 31 is arranged in the integrated switch device 100. The valve installation parts 17 respectively assembles the first gas valve 14 and the second gas valve 15, and the valve installation parts 17 are connected to the housing 16, so that the first gas valve 14 and the second gas valve 15 are arranged around the electric control module 31. In one embodiment, the valve installation parts 17 are integrally formed with the housing 16.

Figure 8:
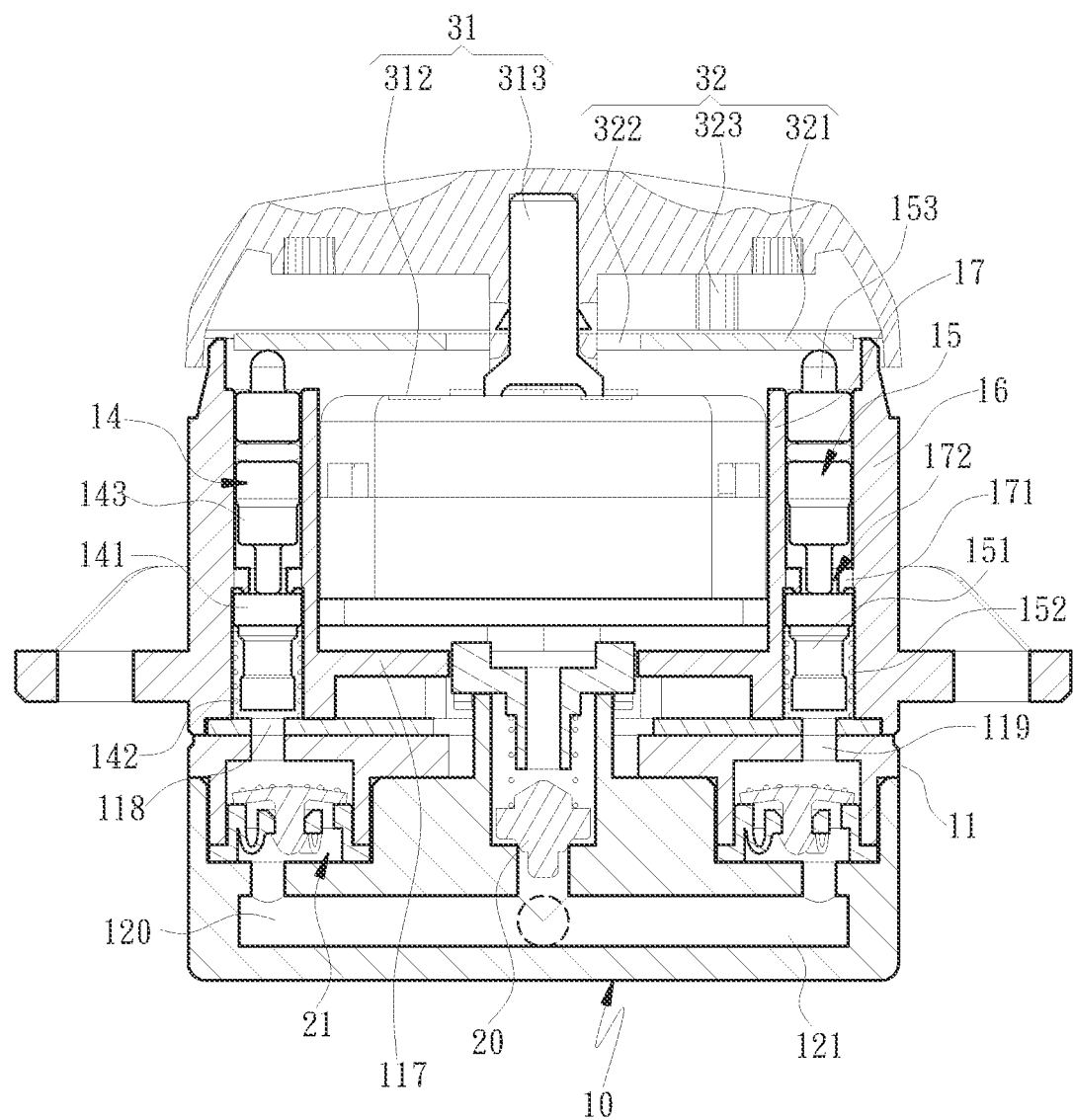
FIG. 8 is a cross-section diagram of an embodiment of the invention.
Figure 9:
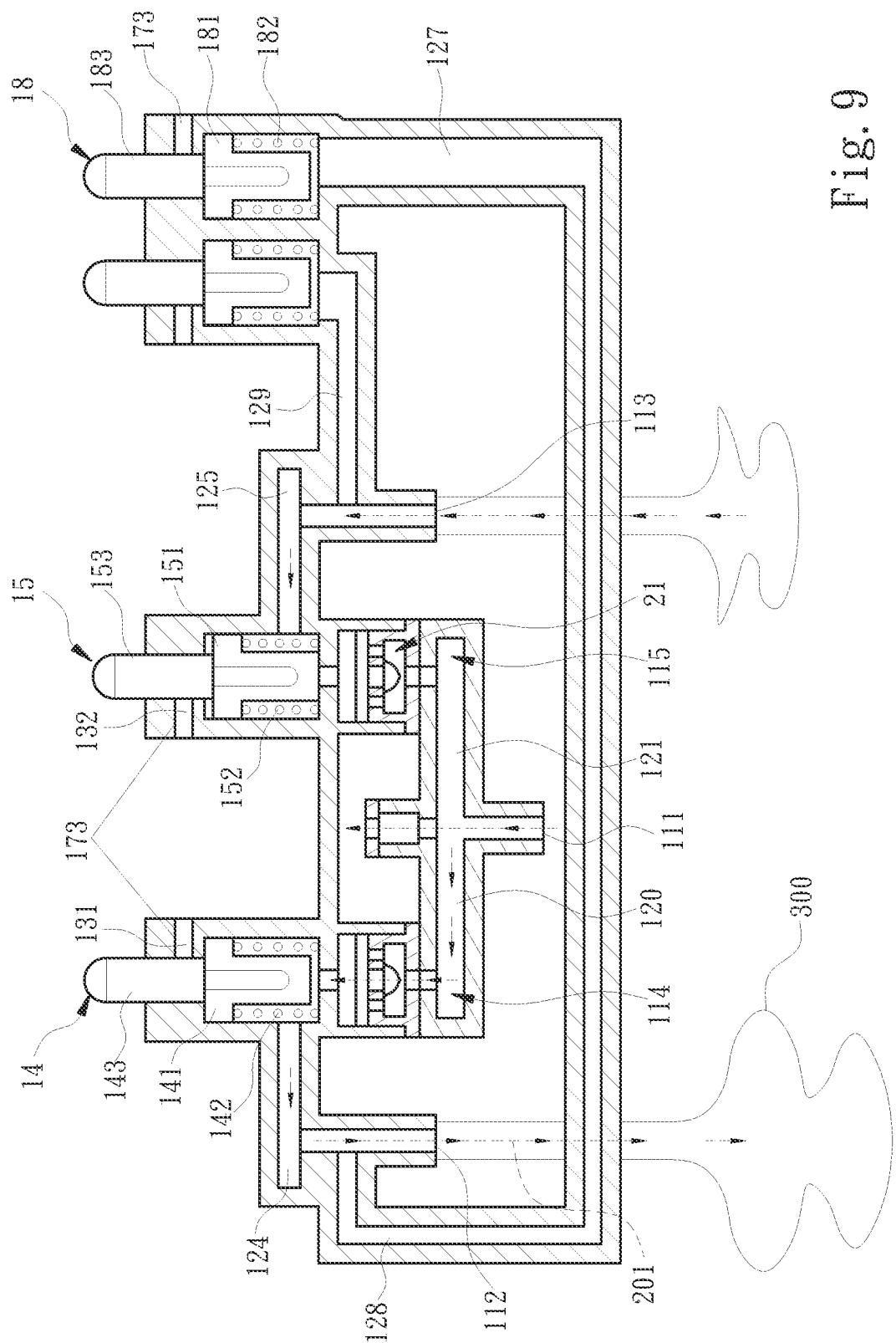
FIG. 9 is a schematic diagram of a single charging mode of an embodiment of the invention.
Figure 10:
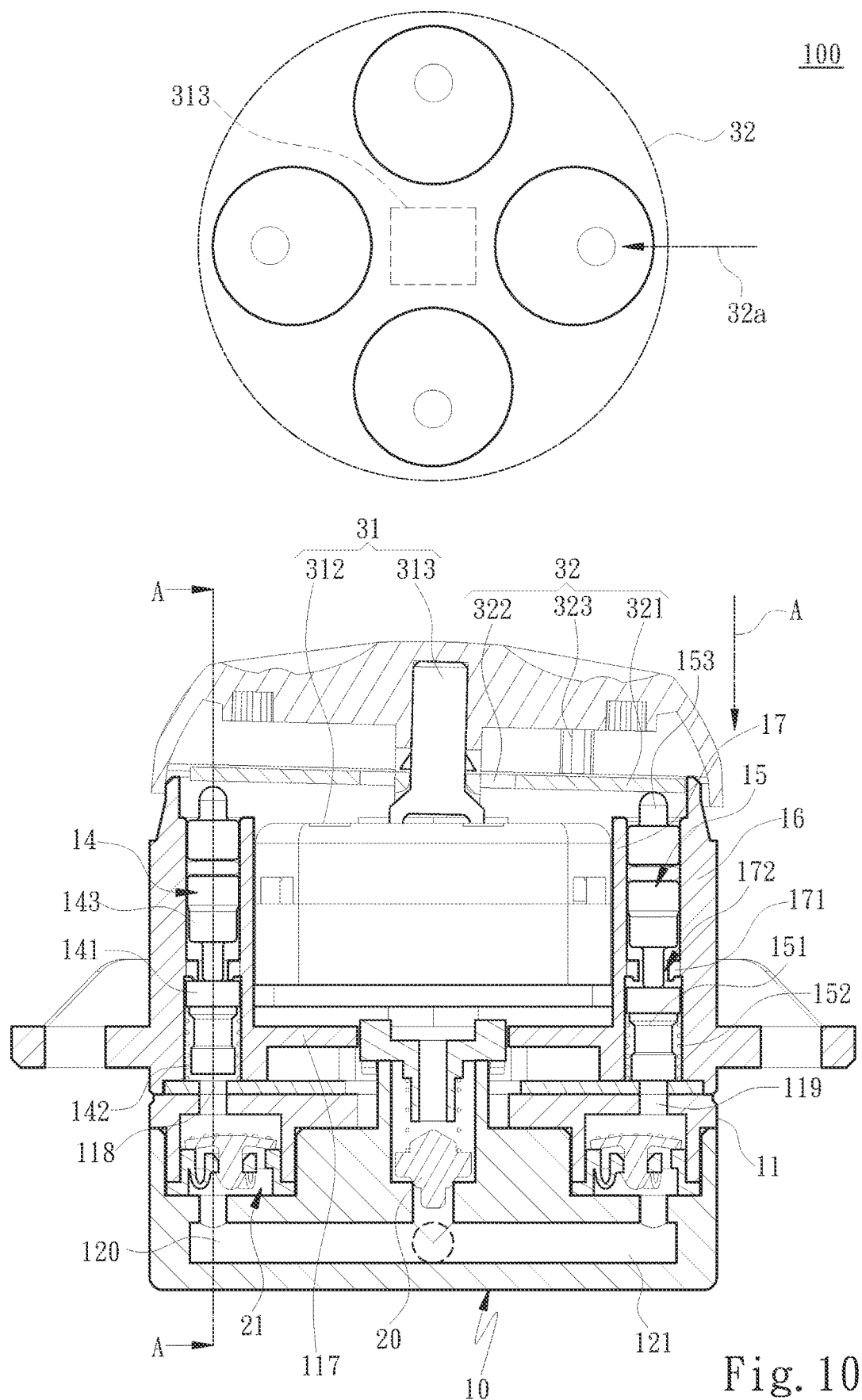
FIG. 10 is a cross-section diagram of a single charging mode structure of an embodiment of the invention.
Figure 11:
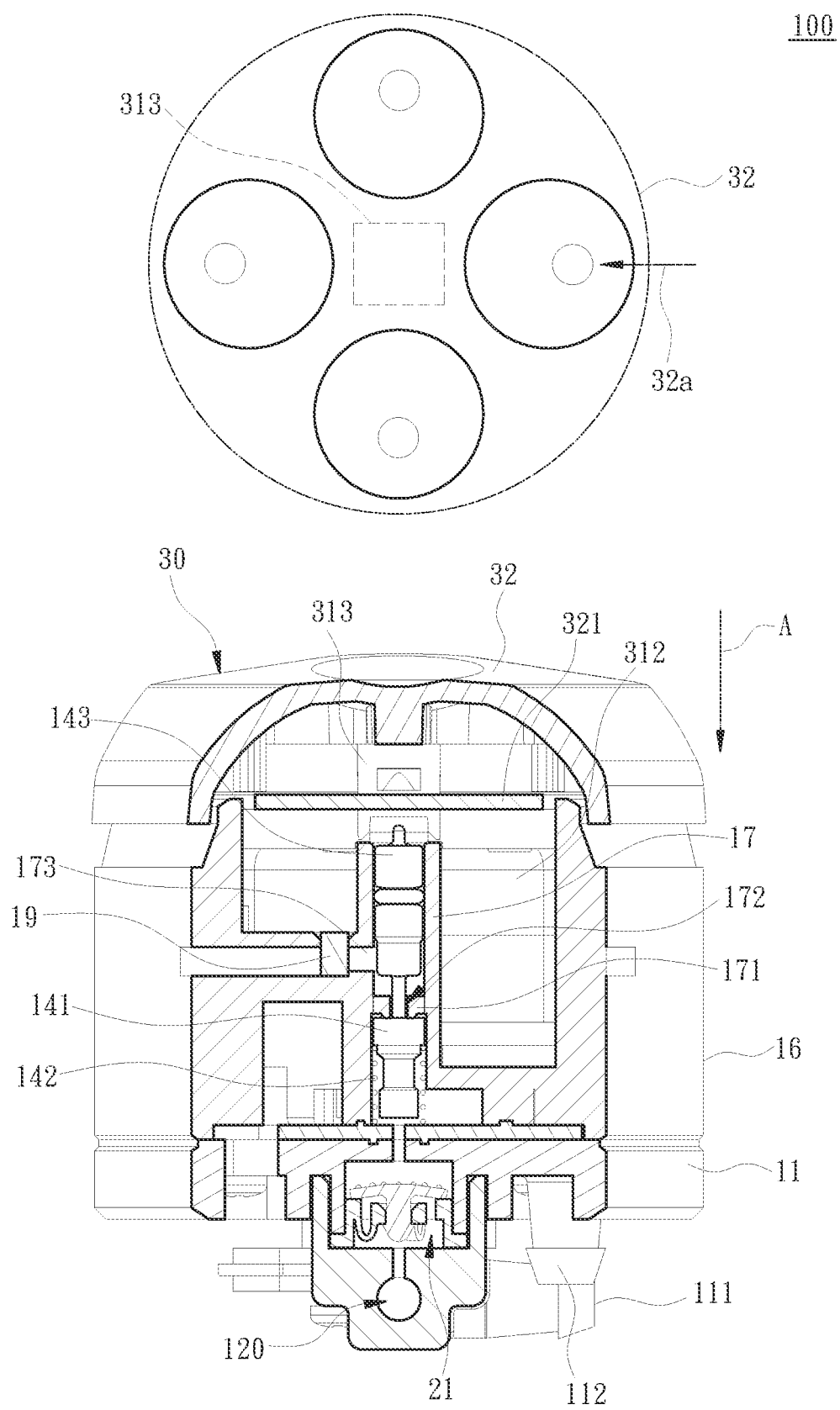
FIG. 11 is a cross-section diagram of line A-A in FIG. 10.

Further, referring to FIG. 8, FIG. 9, and FIG. 10, in one embodiment, the electric control module 31 comprises a signal generator 312 and a control part 313 connected to the signal generator 312. One end of the control part 313 not assembled with the signal generator 312 is assembled with the operation cover 32, and the control part 313 is assembled at the center of the operation cover 32. In addition, the operation cover 32 can control the first gas valve 14 and the second gas valve 15 at the same time while performing the displacement stroke A, so that the displacement stroke A of the operation cover 32 is a tilted movement, that is, the operation cover 32 is displaced toward the edges around the control part 313 through the tilted movement, thereby controlling the first gas valve 14 and the second gas valve 15.

Further, in one embodiment, the operation cover 32 comprises a push plate 321 facing the first gas valve 14 and the second gas valve 15, and an installation opening 322 arranged on the push plate 321. When the operation cover 32 performs the displacement stroke A, the push plate 321 contacts the first gas valve 14 or the second gas valve 15, and the installation opening 322 provides the control part 313 to install therein. When the push plate 321 pushes the first gas valve 14 and the second gas valve 15, the installation opening 322 prevents the control part 313 from intervening actions of the push plate 321. Furthermore, in order to make sure the operation cover 32 push the push plate 321 during the displacement stroke A, the operation cover 32 further comprises a plurality of auxiliary push parts 323 respectively arranged on the side of the push plate 321 that does not face the first gas valve 14 and the second gas valve 15. In one embodiment, the auxiliary push parts 323 are extended from the cover body of the operation cover 32 toward the push plate 321 or are separated from the cover body of the operation cover 32.

Figure 4:
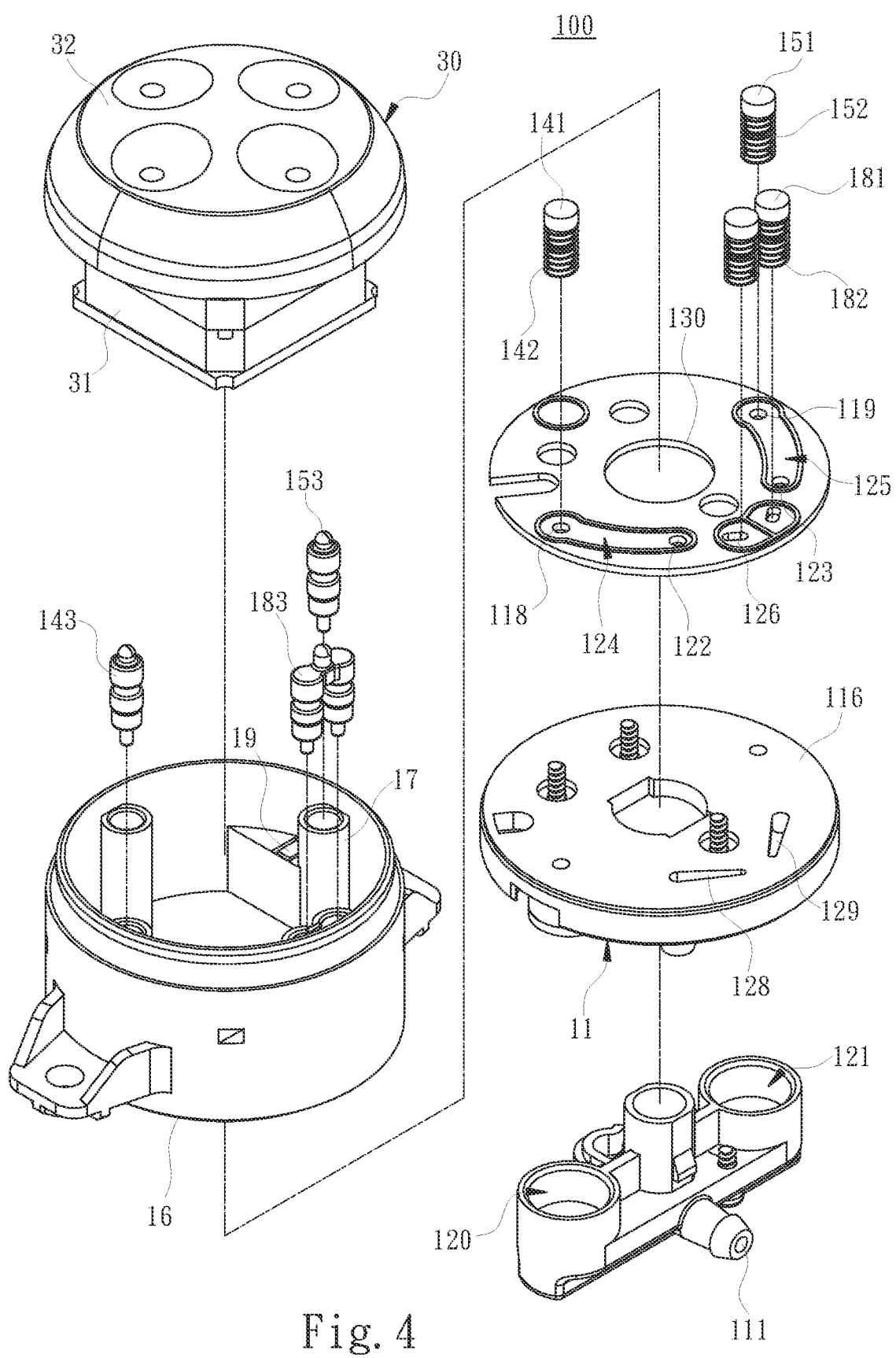
FIG. 4 is an exploded perspective view of an embodiment of the invention.
Figure 5:
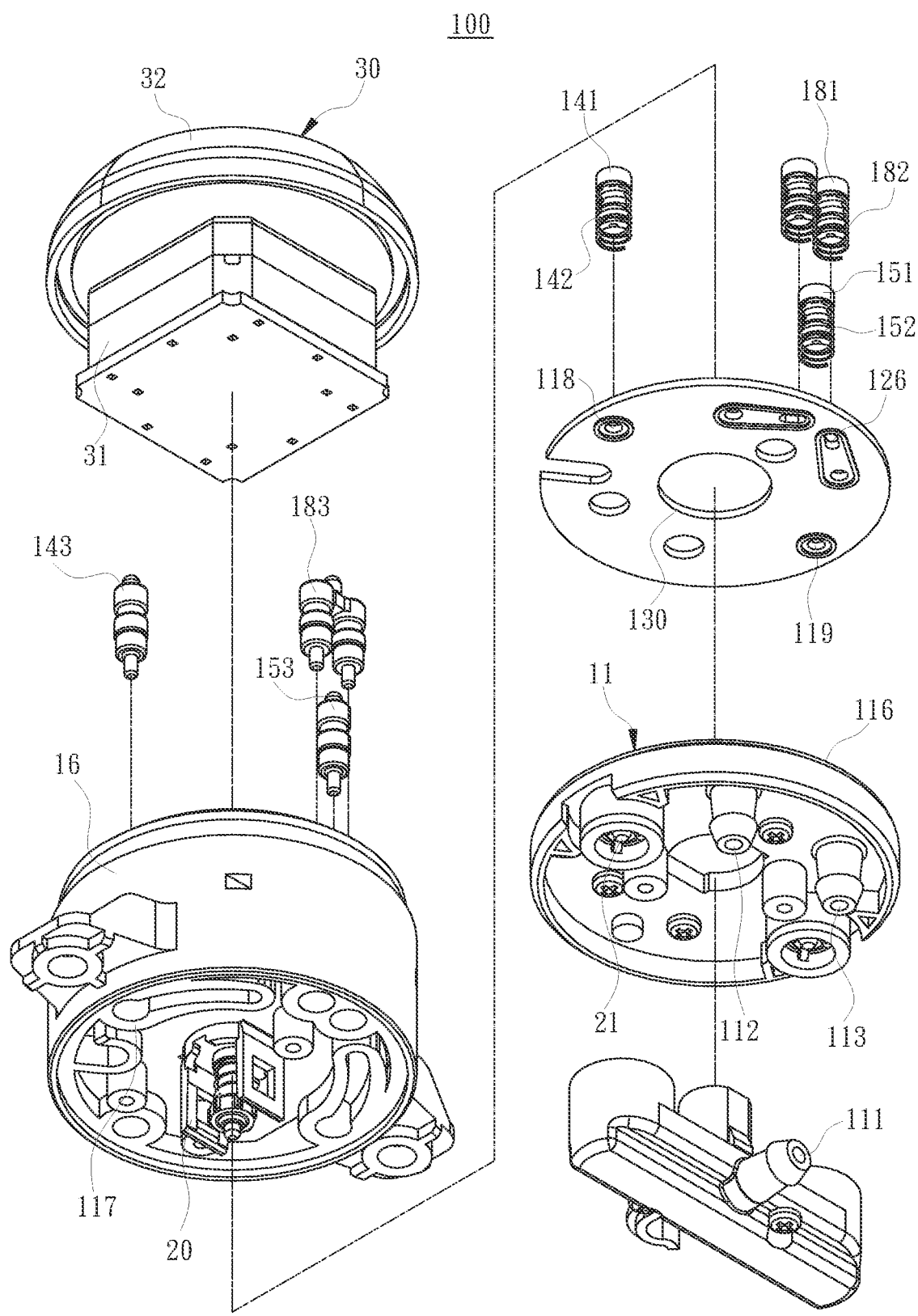
FIG. 5 is an exploded perspective view from another angle of an embodiment of the invention.

In another aspect, referring to FIG. 4 and FIG. 5, the gas receiving base 116 is composed of a plurality of components. The channel seat 11 comprises a gas receiving base 116 and a gas guiding plate 117 assembled with the gas receiving base 116. The gas receiving base 116 is provided with a first gas vent 118 facing the first gas valve 14, a second gas vent 119 facing the second gas valve 15, a first channel 120 communicated with the first gas vent 118 and the gas inlet 111, a second channel 121 communicated with the second gas vent 119 and the gas inlet 111, a third gas vent 122 communicated with the first gas outlet 112 and a fourth gas vent 123 communicated with the second gas outlet 113. Further, at least one of the gas receiving base 116 and the gas guiding plate 117 is provided with a third channel 124 and a fourth channel 125 on one side facing the other. The third channel 124 is communicated with the first gas vent 118 and the third gas vent 122 and the fourth channel 125 is communicated with the second gas vent 119 and the fourth gas vent 123. Further, referring to FIG. 5, FIG. 14 and FIG. 15, the first gas supply path 114 is formed with the first channel 120, the third channel 124 and the first gas outlet 112; and the second gas supply path 115 is formed with the second channel 121, the fourth channel 125 and the second gas outlet 113. In addition, in one embodiment, the gas guiding plate 117 is integrally formed on the housing 16.

Further, referring to FIG. 8 and FIG. 9 again, the first gas valve 14 is arranged on the first gas supply path 114. The first gas valve 14 comprises a first plug 141 facing the first gas vent 118, a first elastic member 142 sleeved on the first plug 141 and abutting the first plug 141 and the gas receiving base 116 at two ends respectively, and a first interlocking member 143 contacting the first plug 141 and the push plate 321 at two ends respectively. Further, referring to FIG. 10 and FIG. 14 again, the first gas valve 14 is installed in one of the valve installation parts 17. Further, each valve installation part 17 comprises a stopper 171 installed inside the valve installation part 17 and an opening 172 provided on the stopper 171. When the first gas valve 14 is pushed by the operation cover 32 to be in the first blocking position, because the first interlocking member 143 is pushed by the push plate 321, the first interlocking member 143 pushes the first plug 141, which makes the first plug 141 be linearly displaced in the valve installation part 17, thereby releasing the opening 172 and closing the first gas vent 118. At this time, the first gas supply path 114 is blocked by the first gas valve 14, so that the gas 201 in the gas pump 200 cannot enter the first gas supply path 114. However, when the push plate 321 stops acting on the first interlocking member 143, the first gas valve 14 will switch from the first blocking position to the first releasing position. At this time, the first plug 141 is pushed by the first elastic member 142, so that the first plug 141 is pushed against the stopper 171, that is, the first plug 141 releases the first gas vent 118. At this time, the first gas supply path 114 is conducted. Further, referring to FIG. 8 and FIG. 9 again, the second gas valve 15 has the same structure as the first gas valve 14, that is, the second gas valve 15 also comprises a second plug 151, a second elastic member 152 and a second interlocking member 153. Although the second gas valve 15 is arranged at a position facing the second gas vent 119 to block or conduct the second gas supply path 115, the function and implementation of the second gas valve 15 are the same as those of the first gas valve 14, which will not be repeated here.

Further, an actual implementation of the integrated switch device 100 is illustrated. Referring to FIG. 8, FIG. 9, FIG. 10, FIG. 11, FIG. 12, and FIG. 13, by controlling the first gas valve 14 or the second gas valve 15 of the gas valve assembly 10, the integrated switch device 100 switches between a pressure holding state, a single-side gas charging mode and a double-side gas charging mode. First of all, it is assumed that the operation cover 32 is not operated at the beginning, that is, the operation cover 32 does not trigger the electric control module 31, nor does it control the first gas valve 14 and the second gas valve 15, so that the gas pump 200 cannot input the gas 201 into the integrated switch device 100. In an embodiment, when the first gas outlet 112 and the second gas outlet 113 are respectively connected to one of the airbags 300, both the airbags 300 are kept in the uninflated pressure holding state.

Further, when the operation cover 32 is operated to trigger the electric control module 31, the operation cover 32 pushes the first interlocking member 143 or the second interlocking member 153, so that the integrated switch device 100 enters the single-side gas charging mode. The process that one side of the operation cover 32 (marked by 32a, indicated by the arrow in FIG. 10) is operated to push the second interlocking member 153 will be described, but not limited thereto. When the integrated switch device 100 is in the single-side gas charging mode, one side 32a of the operation cover 32 is operated. At this time, the second gas valve 15 corresponding to the side 32a of the operation cover 32 is pushed thereby, so that the second interlocking member 153 is pushed to interlock the second plug 151. Hence, the second plug 151 closes the second gas vent 119 and blocks the gas 201 from flowing through the second channel 121 into the fourth channel 125. In other words, the second gas supply path 115 is blocked by the second gas valve 15. At this time, because the first interlocking member 143 is not pushed, the first plug 141 continuously abuts the stopper 171, and the gas 201 from the gas inlet 111 enters the third channel 124 from the first channel 120 and then flow to the first gas outlet 112. In an embodiment, when the first gas outlet 112 is connected to one of the airbags 300, the gas pump 200 can inflate the airbag 300. Further, referring to FIG. 9, in one embodiment, the channel seat 11 further comprises a first exhaust path 131 and a second exhaust path 132. Specifically, one of the through holes 173 communicated with the inside of the valve installation parts 17 and the inside of the housing 16 is arranged in one of the valve installation parts 17 in correspondence to the second gas valve 15. The second exhaust path 132 comprises the second channel 121, the fourth channel 125 and one of the through holes 173 in correspondence to the second gas valve 15. When the second gas valve 15 blocks the second gas supply path 115, the second gas valve 15 will conduct the second exhaust path 132. At this time, the second gas valve 15 is pushed from the second releasing position, and the second interlocking member 153 is displaced toward the direction facing the second gas vent 119, so that the through holes 173 in correspondence to the second gas valve 15 is released, and the gas 201 in the airbag 300 is discharged. In another aspect, one of the through holes 173 communicated with the inside of the valve installation parts 17 and the inside of the housing 16 is provided in the valve installation parts 17 in correspondence to the first gas valve 14. The first exhaust path 131 comprises the first channel 120, the third channel 124 and one of the through holes 173 in correspondence to the first gas valve 14. When the position of the operation cover 32 corresponding to the first gas valve 14 is operated, the second gas supply path 115 is conducted because the second gas valve 15 does not close the second gas vent 119, and the first gas valve 14 is controlled by the operation cover 32 and is pushed from the first releasing position, so that the first gas valve 14 blocks the first gas supply path 114 and conducts the first exhaust path 131 instead. The detailed embodiment is the same as the previous embodiment, which will not be repeated here.

Figure 12:
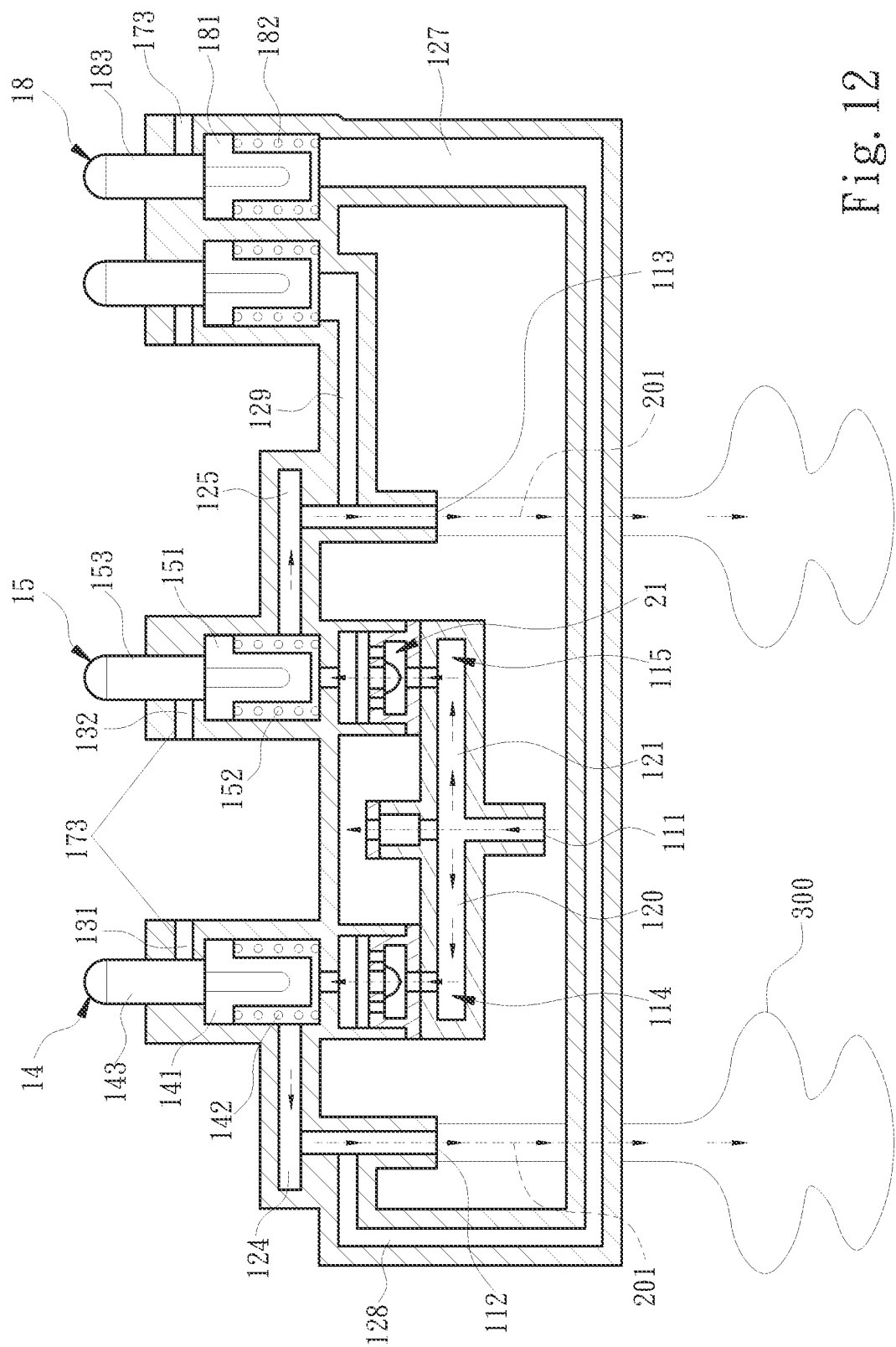
FIG. 12 is a schematic diagram of a dual-charging mode of an embodiment of the invention.
Figure 13:
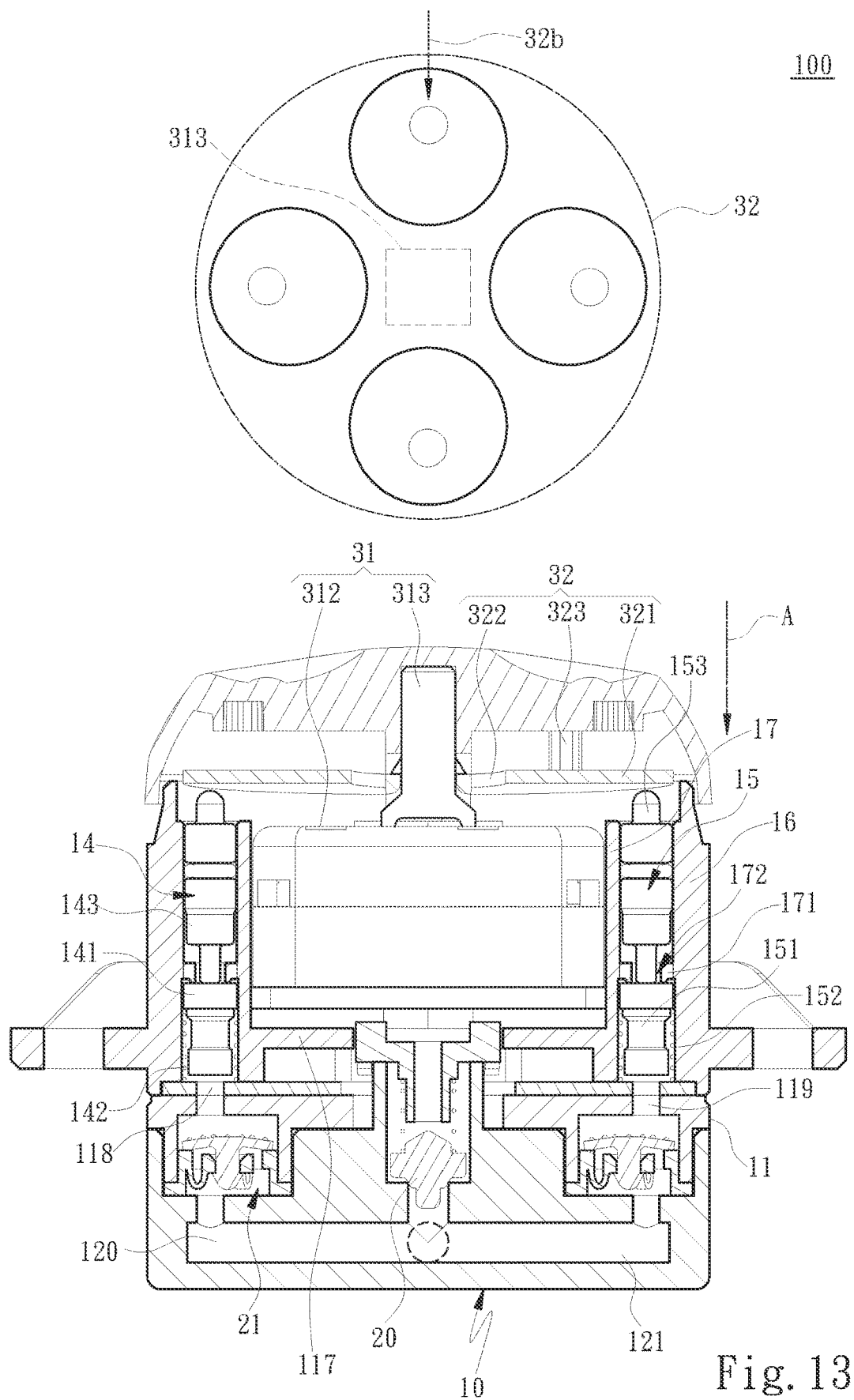
FIG. 13 is a cross-section diagram of a dual charging mode of an embodiment of the invention.

Further, referring to FIG. 12 and FIG. 13 again, when the other side 32b of the operation cover 32 (as indicated by the arrow in FIG. 13) is operated, the integrated switch device 100 enters the double-side gas charging mode. The operation cover 32 triggers the electric control module 31 to output the on-off signal 311 of starting to the gas pump 200, while the push plate 321 does not push the first gas valve 14 and the second gas valve 15, that is, the first channel 120 is communicated with the third channel 124, and the second channel 121 is communicated with the fourth channel 125. At this time, the gas 201 of the gas pump 200 flows to both the first gas outlet 112 and the second gas outlet 113. In an embodiment, when the first gas outlet 112 is connected to the airbag 300 and the second gas outlet 113 is connected to another airbag 300, the gas pump 200 can simultaneously inflate the two airbags 300.

Figure 6:
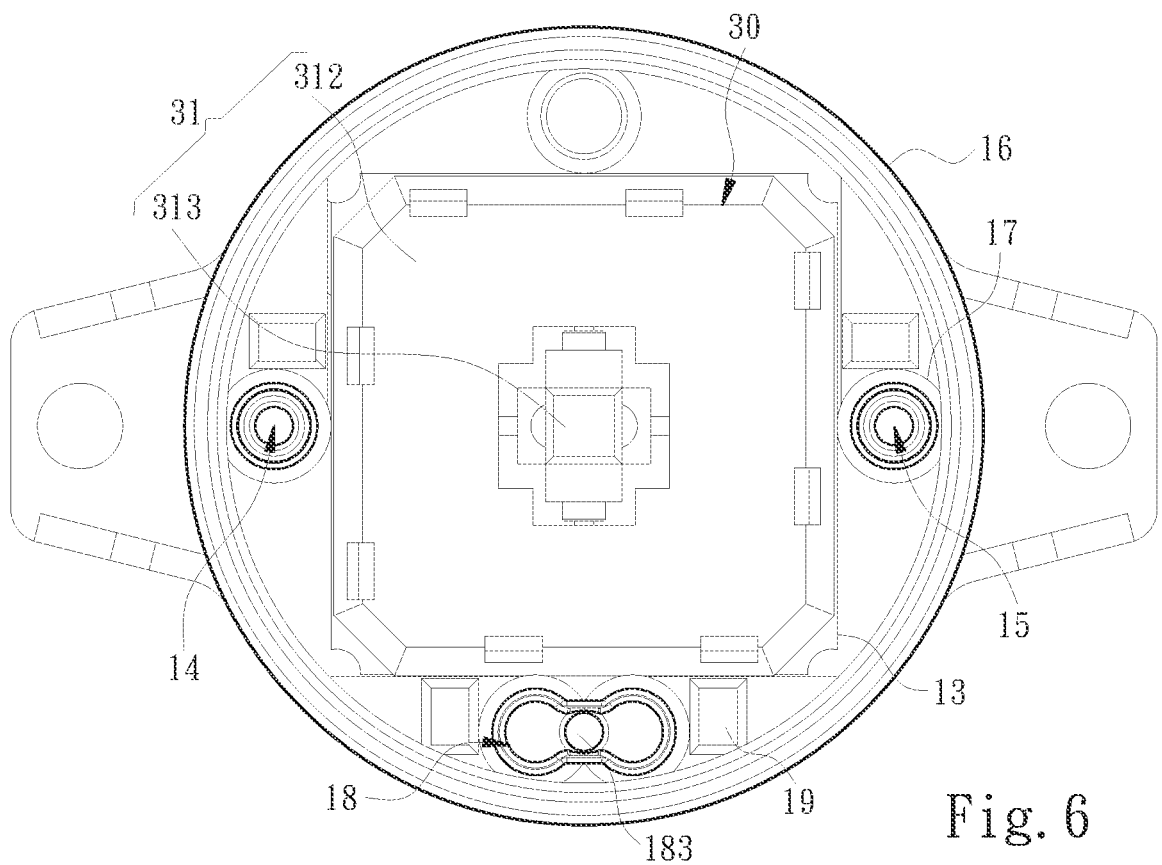
FIG. 6 is a top view of a housing of an embodiment of the invention.
Figure 7:
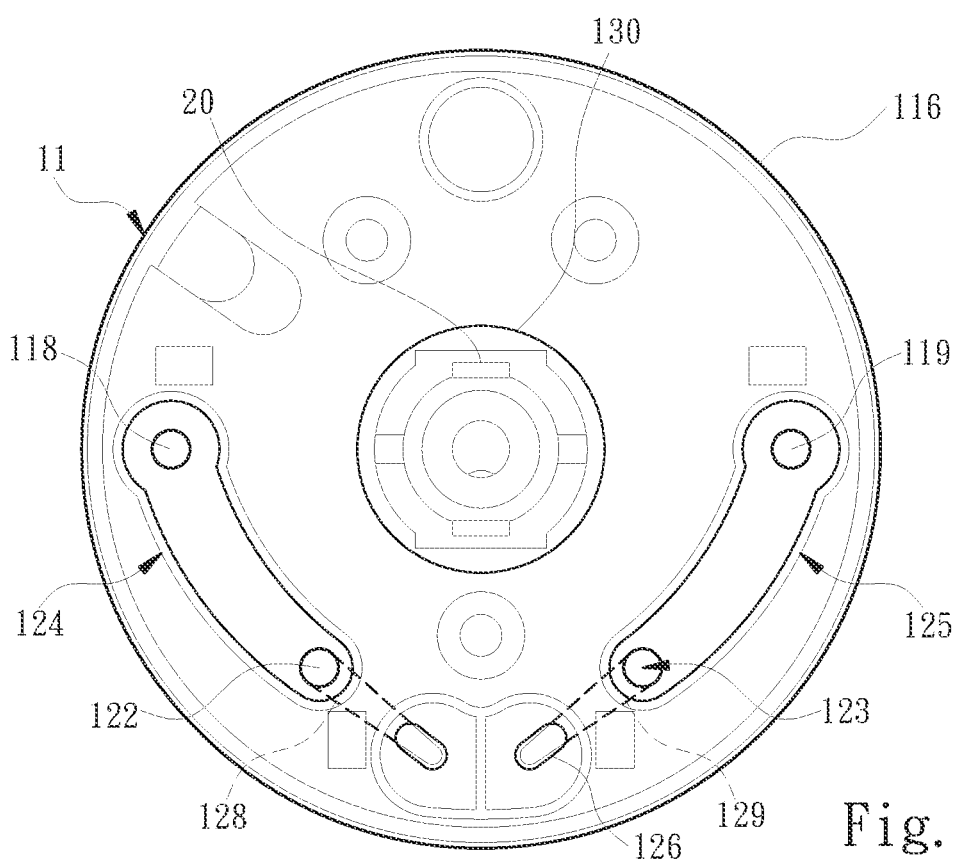
FIG. 7 is a top view of a gas receiving base of an embodiment of the invention.

In one embodiment, referring to FIG. 6, FIG. 7 and FIG. 9 again, in addition to the above-mentioned gas charging modes, the integrated switch device 100 has an exhaust function. In other words, the gas valve assembly 10 comprises at least one third gas valve 18. The operation cover 32 controls one of the first gas valve 14, the second gas valve 15 and the third gas valve 18 while the electric control module 31 is triggered. The channel seat 11 further comprises an exhaust port 126 and an exhaust path 127 connecting the first gas outlet 112, the second gas outlet 113 and the exhaust port 126. The third gas valve 18 is arranged on the exhaust path 127, and the third gas valve 18 is controlled to switch between a third blocking position blocking the exhaust path 127 and a third releasing position conducting the exhaust path 127. Further, the exhaust port 126 is located in the housing 16, and the gas receiving base 116 is provided with a first exhaust passage 128 communicated with the third gas vent 122 and the exhaust port 126 and a second exhaust passage 129 communicated with the fourth gas vent 123 and the exhaust port 126. Further, the exhaust path 127 is formed with the first exhaust passage 128 and the second exhaust passage 129. Further, referring to FIG. 4, FIG. 14, FIG. 15, and FIG. 16, the third gas valve 18 is also installed in one of the valve installation parts 17, and in correspondence to the third gas valve 18, the valve installation parts 17 are also provided with at least one through holes 173. In addition, the third gas valve 18 has the same structure as the first gas valve 14 and the second gas valve 15. The third gas valve 18 also comprises a third plug 181, a third elastic member 182 and a third interlocking member 183. When the third gas valve 18 is pushed by the operation cover 32, the third gas valve 18 enters the third releasing position. At this time, the third plug 181 is interlocked by the third interlocking member 183, so that the third plug 181 is displaced toward the exhaust port 126, and then the through holes 173 are released. Therefore, the exhaust path 127 is conducted. When the third gas valve 18 is released by the operation cover 32, the third plug 181 is pushed by the third elastic member 182, so that the third plug 181 is displaced away from the exhaust port 126, and the through holes 173 are blocked.

Figure 14:
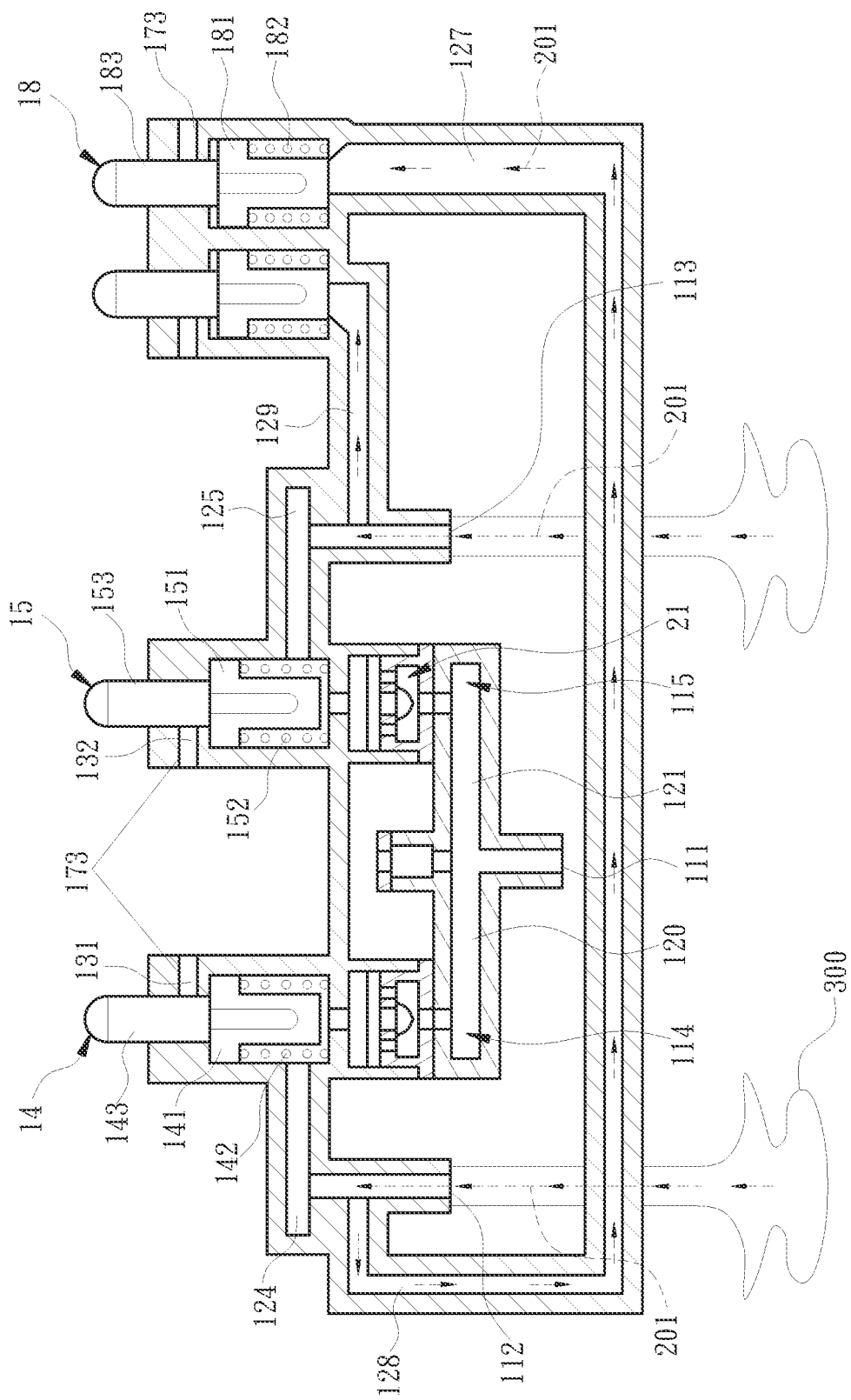
FIG. 14 is a schematic diagram of a gas discharging mode of an embodiment of the invention.
Figure 15:
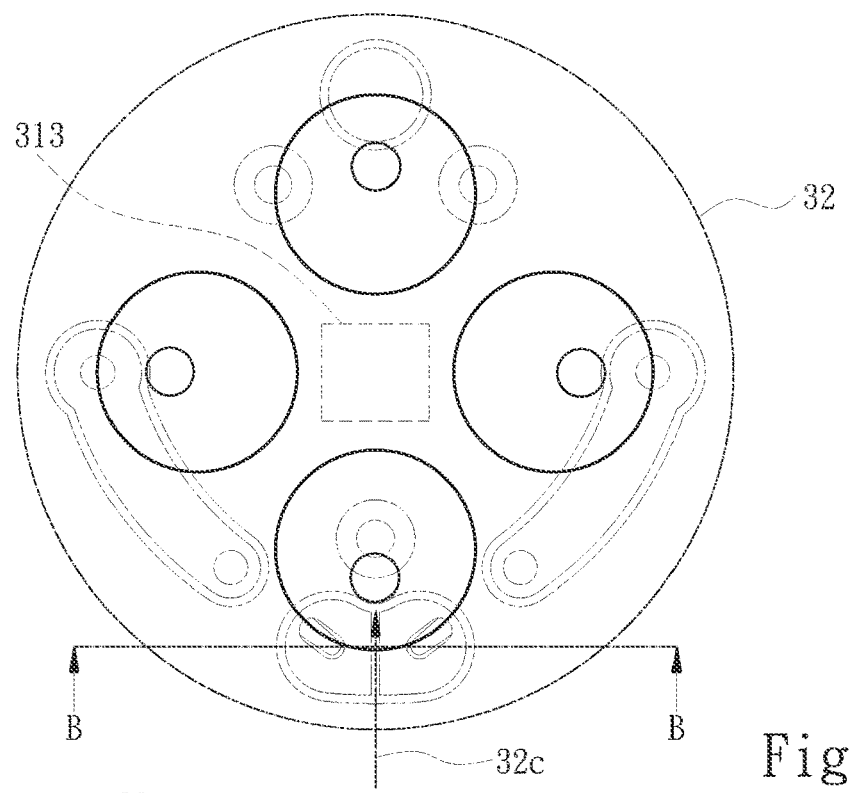
FIG. 15 is a top view of an operation cover of an embodiment of the invention.
Figure 16:
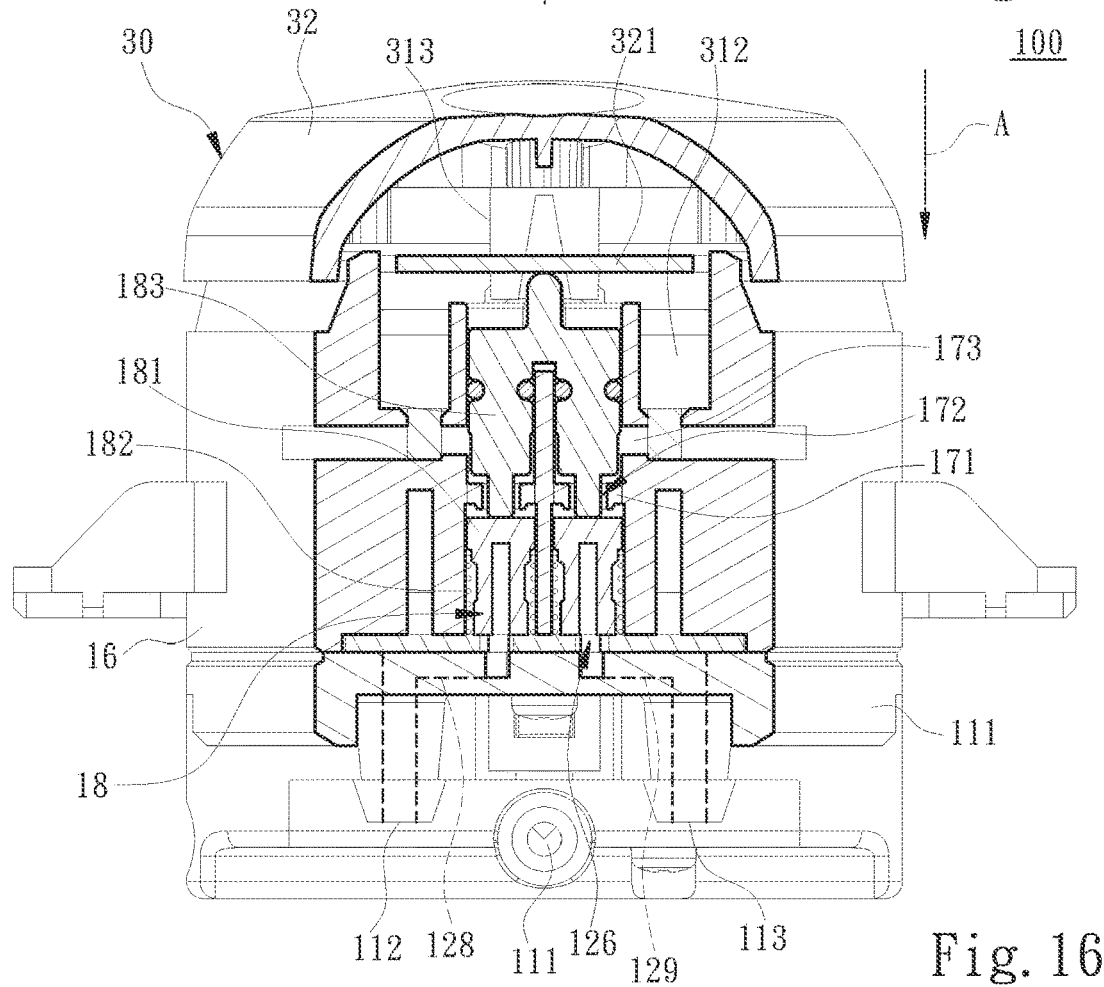
FIG. 16 is a cross-section diagram of line B-B in FIG. 15.

Next, the gas discharging function of the integrated switch device 100 will be described specifically. Referring to FIG. 14, FIG. 15, and FIG. 16, when the operation cover 32 is operated at a position 32c corresponding to the third gas valve 18 (as indicated by the arrow in FIG. 15), the integrated switch device 100 enters an exhaust mode. Under the exhaust mode, the operation cover 32 not only triggers the electric control module 31 to output the on-off signal 311 to the gas pump 200, but also controls the third gas valve 18, so that the push plate 321 pushes the third interlocking member 183, and then the third plug 181 is displaced. Therefore, the third gas valve 18 releases the through holes 173 and communicates the first exhaust passage 128 and the second exhaust passage 129 therewith. In other words, the gas 201 of the airbags 300 enters through the first gas outlet 112 and the second gas outlet 113 respectively, and then the gas 201 is discharged from the through holes 173.

Further, in one embodiment, the gas valve assembly 10 comprises a plurality of mufflers 19 corresponding to the valve installation parts 17, and the plurality of mufflers 19 is made of cotton to reduce noise when the gas 201 is discharged from one of the valve installation parts 17.

In addition, referring to FIG. 5 and FIG. 8 again, in one embodiment, in order to prevent an ultrahigh pressure of the gas output by the gas pump 200 to the integrated switch device 100, the gas valve assembly 10 is further provided with a mechanical pressure regulating assembly 20. Further, the channel seat 11 comprises an installation opening 130 communicates with the first channel 120 and the second channel 121 and allows the mechanical pressure regulating assembly 20 to be installed, so that the gas 201 of the gas pump 200 is regulated after the gas 201 flows into the first channel 120 and the second channel 121 from the gas inlet 111. When the pressure of the gas 201 output by the gas pump 200 is too high, the gas 201 is discharged out of the first channel 120 and the second channel 121 and dispersed into the housing 16, thereby preventing the airbag 300 from being damaged due to the high pressure of the gas output by the gas pump 200. Furthermore, in order to prevent the gas 201 from the first channel 120 and the second channel 121 flowing back, the gas receiving base 116 comprises a plurality of unidirectional vent valves 21 respectively corresponding to the first gas vent 118 and the second gas vent 119. The plurality of unidirectional vent valves 21 prevent the gas 201 from flowing back to the first channel 120 and the second channel 121 after the gas 201 therefrom enters one of the valve installation parts 17 respectively.

What is claimed is:

1. An integrated switch device, connected to a gas pump, comprising:
a gas valve assembly, comprising a channel seat, a first gas valve and a second gas valve, the channel seat comprising a gas inlet connected to the gas pump to receive gas therefrom, a first gas outlet, a second gas outlet, a first gas supply path guiding the gas to be discharged from the first gas outlet, and a second gas supply path guiding the gas to be discharged from the second gas outlet, wherein the first gas valve is arranged on the first gas supply path and is controlled to switch between a first blocking position blocking the first gas supply path and a first releasing position conducting the first gas supply path, and the second gas valve is controlled to switch between a second blocking position blocking the second gas supply path and a second releasing position conducting the second gas supply path; wherein the channel seat further comprises a gas receiving base and a gas guiding plate assembled with the gas receiving base, the gas receiving base is provided with a first gas vent facing the first gas valve, a second gas vent facing the second gas valve, a first channel communicated with the first gas vent and the gas inlet, a second channel communicated with the second gas vent and the gas inlet, a third gas vent communicated with the first gas outlet and a fourth gas vent communicated with the second gas outlet and wherein at least one of the gas receiving base and the gas guiding plate is provided with a third channel and a fourth channel on one side facing the other, the third channel is communicated with the first gas vent and the third gas vent, and the fourth channel is communicated with the second gas vent and the fourth gas vent and wherein the first gas supply path is formed with the first channel and the third channel, and the second gas supply path is formed with the second channel and the fourth channel; and a switch assembly, assembled with the gas valve assembly, and the switch assembly comprising an electric control module electrically connected to the gas pump and controlled to output an on-off signal to the gas pump, and an operation cover assembled with the electric control module, wherein the operation cover performs a displacement stroke relative to the electric control module and triggers the electric control module to output the on-off signal while performing the displacement stroke, and wherein the operation cover controls at least one of the first gas valve and the second gas valve while triggering the electric control module.

2. The integrated switch device according to claim 1, wherein the gas valve assembly further comprises at least one third gas valve, and the operation cover controls one of the first gas valve, the second gas valve and the third gas valve while triggering the electric control module; wherein the channel seat comprises an exhaust port and an exhaust path connecting the first gas outlet, the second gas outlet and the exhaust port; and wherein the third gas valve is arranged on the exhaust path and is controlled to switch between a third blocking position blocking the exhaust path and a third releasing position conducting the exhaust path.

3. The integrated switch device according to claim 2, wherein the gas valve assembly further comprises a housing assembled with the channel seat and provided the electric control module to arranged therein, and a plurality of valve installation parts arranged in the housing and provided for the first gas valve, the second gas valve and the third gas valve to install, respectively; and the exhaust port of the channel seat is located in the housing.

4. The integrated switch device according to claim 3, wherein the electric control module comprises a signal generator and a control part connected to the signal generator and assembled with the operation cover, the control part is arranged at the center of the operation cover to control the operation cover to perform a tilted displacement.

5. The integrated switch device according to claim 1, wherein the gas valve assembly further comprises a housing assembled with the channel seat and provided the electric control module to be arranged therein, and a plurality of valve installation parts arranged in the housing and provided for the first gas valve and the second gas valve to install, respectively.

6. The integrated switch device according to claim 1, wherein the electric control module comprises a signal generator and a control part connected to the signal generator and assembled with the operation cover, the control part is arranged at the center of the operation cover to control the operation cover to perform a tilted displacement.

7. The integrated switch device according to claim 2, wherein the channel seat further comprises a first exhaust passage communicated with the third gas vent and the exhaust port, and a second exhaust passage communicated with the fourth gas vent and the exhaust port; and wherein the exhaust path is formed with the first exhaust passage and the second exhaust passage.

8. The integrated switch device according to claim 7, wherein the gas valve assembly further comprises a mechanical pressure regulating assembly, and the channel seat comprises an installation opening communicated with the first channel and the second channel, and the installation opening is provided for the mechanical pressure regulating assembly to install thereon.

9. The integrated switch device according to claim 7, wherein the first gas valve comprises a first plug facing the first gas vent, a first elastic member sleeved on the first plug and abutting the first plug and the gas receiving base at two ends respectively, and a first interlocking member pushed by the operation cover to interlock the first plug to switch between the first blocking position and the first releasing position; and wherein the second gas valve comprises a second plug facing the second gas vent, a second elastic member sleeved on the second plug and abutting the second plug and the gas receiving base at both ends respectively, and a second interlocking member pushed by the operation cover to interlock the second plug to switch between the second blocking position and the second releasing position; and wherein the third gas valve comprises a third plug facing the exhaust port, a third elastic member sleeved on the third plug and abutting the third plug and the gas receiving base at both ends respectively, and a third interlocking member pushed by the operation cover to interlock the third plug to switch between the third blocking position and the third releasing position.

10. The integrated switch device according to claim 7, wherein the gas receiving base is composed of a plurality of components, and the gas receiving base comprises a plurality of unidirectional vent valves corresponding to the first gas vent and the second gas vent.

11. The integrated switch device according to claim 1, wherein the gas receiving base is composed of a plurality of components, and the gas receiving base comprises a plurality of unidirectional vent valves corresponding to the first gas vent and the second gas vent.

12. The integrated switch device according to claim 1, wherein the gas valve assembly further comprises a mechanical pressure regulating assembly, the channel seat comprises an installation opening communicated with the first channel and the second channel, and the installation opening is provided with the mechanical pressure regulating assembly.

13. The integrated switch device according to claim 1, wherein the first gas valve comprises a first plug facing the first gas vent, a first elastic member sleeved on the first plug and abutting the first plug and the gas receiving base at two ends respectively, and a first interlocking member pushed by the operation cover to interlock the first plug to switch between the first blocking position and the first releasing position; and wherein the second gas valve comprises a second plug facing the second gas vent, a second elastic member sleeved on the second plug and abutting the second plug and the gas receiving base at two ends respectively, and a second interlocking member pushed by the operation cover to interlock the second plug to switch between the second blocking position and the second releasing position.

* * * * *